(12) United States Patent
Frederiksen et al.

(10) Patent No.: US 12,349,070 B2
(45) Date of Patent: Jul. 1, 2025

(54) NETWORK ASSISTANCE TO RESOLVE WAKE-UP SIGNAL CONFLICTS

(71) Applicant: Nokia Technologies Oy, Espoo (FI)

(72) Inventors: Frank Frederiksen, Klarup (DK); Daniela Laselva, Klarup (DK); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 462 days.

(21) Appl. No.: 17/792,619

(22) PCT Filed: Feb. 7, 2020

(86) PCT No.: PCT/IB2020/050985
§ 371 (c)(1),
(2) Date: Jul. 13, 2022

(87) PCT Pub. No.: WO2021/156652
PCT Pub. Date: Aug. 12, 2021

(65) Prior Publication Data
US 2023/0040865 A1    Feb. 9, 2023

(51) Int. Cl.
*H04W 52/02* (2009.01)
*H04L 5/00* (2006.01)

(52) U.S. Cl.
CPC ....... *H04W 52/0232* (2013.01); *H04L 5/0051* (2013.01)

(58) Field of Classification Search
CPC .......... H04W 52/0232; H04W 76/28; H04L 5/0051; Y02D 30/70
USPC ....................................................... 370/318
See application file for complete search history.

(56) References Cited

U.S. PATENT DOCUMENTS

| | | |
|---|---|---|
| 11,064,437 B2 | 7/2021 | Marin et al. |
| 2019/0182675 A1* | 6/2019 | Pu .......... H04W 24/08 |
| 2022/0400433 A1* | 12/2022 | Xu .......... H04L 5/0091 |

FOREIGN PATENT DOCUMENTS

| WO | WO-2014179921 A1 | 11/2014 |
|---|---|---|
| WO | 2018/091107 A1 | 5/2018 |
| WO | 2019/094480 A1 | 5/2019 |
| WO | 2019/215670 A1 | 11/2019 |

(Continued)

OTHER PUBLICATIONS

Office Action received for corresponding European Patent Application No. 20709708.0, dated Mar. 12, 2024, 6 pages.

(Continued)

*Primary Examiner* — Mang Hang Yeung
(74) *Attorney, Agent, or Firm* — McCarter & English LLP

(57) ABSTRACT

In accordance with example embodiments of the invention there is at least a method and apparatus to perform at least detecting, by a network device of a communication network, at least one failure of network node channel access during or preceding a wake-up signal occasion, and based on the detecting, performing on-duration monitoring. In addition, there is at least a method and apparatus to perform at least determining, by a network node of a communication network, information comprising a configuration for performing on-duration monitoring if a failure of network node channel access is detected during or preceding a wake-up signal occasion; and sending an indication of the information towards the at least one network device.

19 Claims, 3 Drawing Sheets

(56) References Cited

FOREIGN PATENT DOCUMENTS

WO      2021/094648 A1     5/2021

OTHER PUBLICATIONS

Decision of Final Rejection received for corresponding Japanese Patent Application No. 2022-547310, dated Jul. 27, 2023, 6 pages of Final Rejection and 3 pages of Summary available.
"New Wid: UE Power Saving in NR", 3GPP TSG RAN Meetings #84, RP-191607, Agenda: 9.4.6, CATT, Jun. 3-6, 2019, 5 pages.
"New Wid: UE Power Saving Enhancements", 3GPP TSG RAN Meeting #86, RP-193239, Agenda: 9.1.2, MediaTek Inc, Dec. 9-12, 2019, 5 pages.
"Offline Discussion Summary of PDCCH-based Power Saving Signal/Channel", 3GPP TSG RAN WG1 Meeting #98bis, R1-1911558, Agenda: 7.2.9.1, CATT, Oct. 14-20, 2019, pp. 1-39.
"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
"Evaluation Periods for RLM in NR-U", 3GPP TSG-RAN WG4 Meeting #92bis, R4-1912551, Agenda: 8.1.4.8, Qualcomm Incorporated, Oct. 14-18, 2019, 4 pages.
"3rd Generation Partnership Project; Technical Specification Group Radio Access Network; NR; Physical layer procedures for control (Release 16)", 3GPP TS 38.213, V16.4.0, Dec. 2020, pp. 1-181.
"3rd Generation Partnership Project; Technical Specification Group Radio Access Network; NR; Medium Access Control (MAC) protocol specification (Release 16)", 3GPP TS 38.321, V16.8.0, Mar. 2022, pp. 1-159.
"Discussion on RLM requirement for NR-U", 3GPP TSG-RAN WG4 Meeting #93, R4-1914077, Agenda: 9.1.4.8, MediaTek Inc, Nov. 18-22, 2019, 6 pages.
"WF on RRM Requirements for NR-U (all agreements in RAN4#92-bis)", 3GPP TSG-RAN WG4 Meeting #92-Bis, R4-1912846, Agenda: 8.1.4, Ericsson, Oct. 14-18, 2019, 36 pages.
"WF on RRM Requirements for NR-U", 3GPP TSG-RAN WG4 Meeting #92, R4-1910551, Agenda: 9.1.5, Ericsson, Aug. 26-30, 2019, 34 pages.
"3rd Generation Partnership Project; Technical Specification Group Radio Access Network; NR; User Equipment (UE) radio access capabilities (Release 15)", 3GPP TS 38.306, V15.7.0, Sep. 2019, pp. 1-55.
"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.
"3rd Generation Partnership Project; Technical Specification Group Radio Access Network; NR; Physical layer procedures for data (Release 15)", 3GPP TS 38.214, V15.7.0, Sep. 2019, pp. 1-106.
"3rd Generation Partnership Project; Technical Specification Group Radio Access Network; NR; Requirements for support of radio resource management (Release 16)", 3GPP TS 38.133, V16.1.0, Sep. 2019, 1044 pages.
International Search Report and Written Opinion received for corresponding Patent Cooperation Treaty Application No. PCT/IB2020/050985, dated Jun. 22, 2020, 15 pages.
"PDCCH-based power saving channel design", 3GPP TSG-RAN WG1 #98, R1-1909275, Agenda: 7.2.9.1, Qualcomm Incorporated, Aug. 26-30, 2019, 11 pages.
"Design of PDCCH-WUS", 3GPP TSG-RAN WG1 Meeting #99, R1-1912780, Agenda: 7.2.9.1, Ericsson, Nov. 18-22, 2019, pp. 1-13.
"Framework for detecting consistent LBT failures", 3GPP TSG-WG2 Meeting #107, R2-1909161, Agenda: 11.2.1.2, ZTE Corporation, Aug. 26-30, 2019, 6 pages.
"Multiple DRX configurations", 3GPP TSG-RAN WG2 Meeting #106, R2-1905607, Agenda: 11.11.4.4, OPPO, May 13-17, 2019, 4 pages.
Office Action received for corresponding European Patent Application No. 20709708.0, dated Jul. 19, 2024, 6 pages.
Office action received for corresponding European Patent Application No. 20709708.0, dated Feb. 21, 2023, 8 pages.
Office action received for corresponding Japanese Patent Application No. 2022-547310, dated Jun. 26, 2023, 5 pages of office action and no page of translation available.
"On DL Signals and Channels in NR-U", 3GPP TSG RAN WG1 Meeting #94-bis, R1-1810440, Agenda: 7.2.2.3.1, MediaTek Inc, Oct. 8-12, 2018, 4 pages.
"Discussion on DRX for NR-U", 3GPP TSG-RAN WG2 Meeting #105, R2-1901180, Agenda: 11.2.1.2, Nokia, Feb. 25-Mar. 1, 2019, 3 pages.
"Remaining issues on UL LBT", 3GPP TSG-RAN WG2 Meeting #107bis, R2-1913287, Agenda: 6.2.2.2, Nokia, Oct. 14-18, 2019, 3 pages.
Office action received for corresponding Chinese Patent Application No. 202080095804.8, dated Sep. 30, 2024, 9 pages of office action and 7 pages of translation available.
Office Action received for corresponding Vietnamese Patent Application No. 1-2022-05686, dated Sep. 5, 2024, 2 pages of Office Action and 2 pages of translation available.
Office action received for corresponding Indian Patent Application No. 202217039876, dated Dec. 9, 2022, 7 1 pages.

\* cited by examiner

|  | Cat 2 LBT | Cat 4 LBT |
|---|---|---|
| DRS alone or multiplexed with non-unicast data (e.g. OSI, paging, RAR) | When the DRS duty cycle ≤1/20, and the total duration is up to 1 ms: 25 µs Cat 2 LBT is used (as in LAA) | When DRS duty cycle is > 1/20, or total duration > 1 ms |
| DRS multiplexed with unicast data | N/A except for the cases discussed in the Note below | Channel access priority class is selected according to the multiplexed data |
| PDCCH and PDSCH | N/A except for the cases discussed in the Note below | Channel access priority class is selected according to the multiplexed data |

110 → (row 1)
120 → (row 2)
130 → (row 3)

FIG. 1

| 210 | 220 | 230 | 240 |
|---|---|---|---|
| DRS-WindowLength-r16 DiscoveryBurst-WindowLength-r16 | Add in ServingCellConfigCommon and ServingCellConfigCommonSIB. FFS how the window length is indicated (in ms/slot/SSB position index). Any SSB beyond indicated window will be assumed to be not transmitted | FFS value FFS window length unit (can be configured in ms/slot/SSB position index) {0.5ms,1ms,2ms,3ms,4ms,5ms} | Agreement:<br>• DRS transmission window duration can be configured as 0.5 1, 2, 3, 4, or 5 ms<br>• If the DRS transmission window duration is not known, a UE may assume the DRS transmission window has a duration of 5 ms |

FIG. 2

NETWORK ASSISTANCE TO RESOLVE WAKE-UP SIGNAL CONFLICTS

RELATED APPLICATION

This application was originally filed as PCT Application No. PCT/IB2020/050985, filed on Feb. 7, 2020, which is incorporated herein by reference in its entirety.

TECHNICAL FIELD

The teachings in accordance with the exemplary embodiments of this invention relate generally to performing on-duration monitoring based on detection of a failure of network node channel access and, more specifically, relate to performing on-duration monitoring based on detection of a failure of network node channel access during or preceding a wake-up signal occasion.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- ACK acknowledgement
- BFR beam failure recovery
- CA carrier aggregation
- CBRA contention Based Random Access
- CFRA contention Free Random Access
- COT channel occupancy time
- CRC cyclic redundancy check
- C-RNTI cell-radio network temporary identifier
- CSI-RS Channel state information reference signals
- DCI downlink control information
- DL downlink
- DRB data radio bearer
- DRX discontinuous reception
- LBE load based equipment
- LBT Listen-Before-Talk
- MAC medium access control
- MCG master cell group
- NR-U NR on Unlicensed
- NW network
- OSI other system information
- PCell primary cell
- PDCCH physical downlink control channel
- PDSCH physical downlink shared channel
- PRACH physical random access channel
- PCell primary cell
- PSCell primary secondary cell
- PS-RNTI power saving radio network temporary identifier
- RA random access
- RA-RNTI random access radio network temporary identifier
- RACH random access channel
- RAR random access response
- RLM radio link monitoring
- RNTI radio network temporary identifier
- RRC radio resource control
- RRM radio resource management
- SCell secondary cell
- SCG secondary cell group
- SPCell special cell, primary cell of a master or secondary cell group
- SSB Synchronization signal blocks
- TC-RNTI temporary cell-radio network temporary identifier
- UL uplink
- WUS wake-up signal In radio technology systems at the time of this application, there are multiple access technologies that have been adopted in various telecommunication standards to provide a common protocol that enables control behavior of different wireless devices control such as user equipment (UE) for communications including uplink (UL) and/or downlink (DL) communications. This behavior can relate to frequency, timing, and power for the communications.

An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There continues to exist a need for further improvements in at least these telecommunication technologies. Such improvements needed include technologies and operations to make more efficient use of network resources while maintaining a lower power consumption.

Example embodiments of the invention work to improve at least operations in particular associated with failures in such radio technology communications.

SUMMARY

This section contains examples of possible implementations and is not meant to be limiting.

In an example embodiment of the invention there is a method comprises detecting, by a network device of a communication network, at least one failure of network node channel access during or preceding a wake-up signal occasion; and based on the detecting, performing on-duration monitoring.

A further example embodiment is a method comprising the method of the previous paragraph, wherein the network device is in a sleep mode, and wherein the on-duration monitoring is performed without receiving a preceding wake-up signal indicating wake-up during a wake-up signal occasion associated with the sleep mode, wherein the failure of network node channel access is detected based on a lack of detection of one or more signals or channels to be transmitted during a discovery reference signal window, wherein the failure is during a discovery reference signal window that is one of during or preceding the wake-up signal occasion, wherein the failure of network node channel access comprises at least one listen before talk failure of a device of the communication network, wherein at least one of detecting or performing on-duration monitoring is based on an indication from the communication network, wherein the indication is based on at least one of a discontinuous reception cycle or a wake-up signal frequency associated with the network device, and wherein the indication accounts for a number of consecutive ones of the failure of the network node channel access, wherein the on-duration monitoring comprises discontinuous reception on-duration monitoring, wherein the performing on-duration monitoring comprises: based on an indication from the communication network, determining to start a discontinuous reception On-duration timer for the on-duration monitoring, wherein starting the discontinuous reception On-duration timer is performed after N+1 subsequent listen before talk failures observed during at least one discovery reference signal window that occur closest to the wake-up signal occasion, wherein determining to start a discontinuous reception On-duration timer for the on-duration monitoring is based on a wake-up signal configuration from the communication network, wherein the on-duration monitoring is performed based on determining that at least one data radio bearer affected by the failure comprises a delay-stringent requirement, wherein the delay-stringent requirement comprises at least one of a communication network technology requirement or a quality of service requirement, wherein there is determining, based on a required maximum latency level of the delay-stringent requirement of the at least one data radio bearer affected by the failure, a length of the at least one of a discontinuous reception cycle, and wherein the determined length of the at least one of a discontinuous reception cycle is used to establish a dependency between the indication from the communication network and a quality of service requirement of the network device.

A non-transitory computer-readable medium storing program code, the program code executed by at least one processor to perform at least the method as described in the paragraphs above.

In an example aspect of the invention, there is an apparatus such as a user equipment side apparatus or a UE 10 as in FIG. 3, comprising at least one processor; and at least one memory including computer program code, where the at least one memory and the computer program code are configured, with the at least one processor, to cause the apparatus to at least: detect in a communication network, at least one failure of network node channel access during or preceding a wake-up signal occasion; and based on the detecting, perform on-duration monitoring.

A further example embodiment is an apparatus comprising the apparatus of the previous paragraph, wherein the apparatus is in a sleep mode, and wherein the on-duration monitoring is performed without receiving a preceding wake-up signal indicating wake-up during a wake-up signal occasion associated with the sleep mode, wherein the failure of network node channel access is detected based on a lack of detection of one or more signals or channels to be transmitted during a discovery reference signal window, wherein the failure is during a discovery reference signal window that is one of during or preceding the wake-up signal occasion, wherein the failure of network node channel access comprises at least one listen before talk failure of a device of the communication network, wherein at least one of detecting or performing on-duration monitoring is based on an indication from the communication network, wherein the indication is based on at least one of a discontinuous reception cycle or a wake-up signal frequency associated with the network device, and wherein the indication accounts for a number of consecutive ones of the failure of the network node channel access, wherein the on-duration monitoring comprises discontinuous reception on-duration monitoring, wherein the performing on-duration monitoring comprises: based on an indication from the communication network, determining to start a discontinuous reception On-duration timer for the on-duration monitoring, wherein starting the discontinuous reception On-duration timer is performed after N+1 subsequent listen before talk failures observed during at least one discovery reference signal window that occur closest to the wake-up signal occasion, wherein determining to start a discontinuous reception On-duration timer for the on-duration monitoring is based on a wake-up signal configuration from the communication network, wherein the on-duration monitoring is performed based on determining that at least one data radio bearer affected by the failure comprises a delay-stringent requirement, wherein the delay-stringent requirement comprises at least one of a communication network technology requirement or a quality of service requirement, wherein the at least one memory including the computer program code is configured with the at least one processor to cause the apparatus to, determine, based on a required maximum latency level of the delay-stringent requirement of the at least one data radio bearer affected by the failure, a length of the at least one of a discontinuous reception cycle, wherein the determined length of the at least one of a discontinuous reception cycle is used to establish a dependency between the indication from the communication network and a quality of service requirement of the network device.

In accordance with another example aspect of the invention there is an apparatus comprising: means for detecting, by a network device of a communication network, at least one failure of network node channel access during or preceding a wake-up signal occasion; and means, based on the detecting, for performing on-duration monitoring.

In accordance with the example embodiments as described in the paragraph above, at least the means for detecting and performing comprises a network interface, and computer program code stored on a computer-readable medium and executed by at least one processor.

A further example embodiment is an apparatus comprising the apparatus of the previous paragraph, wherein the network device is in a sleep mode, and wherein the on-duration monitoring is performed without receiving a preceding wake-up signal indicating wake-up during a wake-up signal occasion associated with the sleep mode, wherein the failure of network node channel access is detected based on a lack of detection of one or more signals or channels to be transmitted during a discovery reference signal window, wherein the failure is during a discovery reference signal window that is one of during or preceding the wake-up signal occasion, wherein the failure of network node channel access comprises at least one listen before talk failure of a device of the communication network, wherein at least one of detecting or performing on-duration monitoring is based on an indication from the communication network, wherein the indication is based on at least one of a discontinuous reception cycle or a wake-up signal frequency associated with the network device, and wherein the indication accounts for a number of consecutive ones of the failure of the network node channel access, wherein the on-duration monitoring comprises means for discontinuous reception on-duration monitoring, wherein the performing on-duration monitoring comprises: means, based on an indication from the communication network, for determining to start a discontinuous reception On-duration timer for the on-duration monitoring, wherein starting the discontinuous reception On-duration timer is performed after N+1 subsequent listen before talk failures observed during at least one discovery reference signal window that occur closest to the wake-up signal occasion, wherein determining to start a discontinuous reception On-duration timer for the on-duration monitoring is based on a wake-up signal configuration from the communication network, wherein the on-duration monitoring is performed based on determining that at least one data radio bearer affected by the failure comprises a delay-stringent requirement, wherein the delay-stringent requirement comprises at least one of a communication network technology requirement or a quality of service requirement, wherein there is means for determining, based on a required maximum latency level of the delay-stringent requirement of the at least one data radio bearer affected by the failure, a length of the at least one of a discontinuous reception cycle, and wherein the determined length of the at least one of a discontinuous reception cycle is used to establish a dependency between the indication from the communication network and a quality of service requirement of the network device.

In another example aspect of the invention, there is a method comprising: determining, by a network node of a communication network, information comprising a configuration for performing on-duration monitoring if a failure of network node channel access is detected during or preceding a wake-up signal occasion; and sending an indication of the information towards the at least one network device.

A further example embodiment is a method comprising the method of the previous paragraph, wherein the configuration is for use while the at least one network device is in a sleep mode, and wherein the configuration is for the on-duration monitoring to be performed without a preceding wake-up signal indicating wake-up during a wake-up signal occasion associated with the sleep mode, wherein the configuration is for use for detecting the failure of network node channel access based on a lack of detection of one or more signals or channels to be transmitted during a discovery reference signal window, wherein the configuration is for use for detecting the failure of network node channel access during a discovery reference signal window that is one of during or preceding the wake-up signal occasion, wherein the configuration is based on at least one of a discontinuous reception cycle or a wake-up signal frequency associated with the at least one network device, and wherein the indication accounts for a number of consecutive ones of the failure of the network node channel access, wherein the configuration is for use in determining to start a discontinuous reception On-duration timer for the on-duration monitoring after N+1 subsequent listen before talk failures observed during at least one discovery reference signal window that occur closest to the wake-up signal occasion, wherein the information comprises a configuration to start a discontinuous reception On-duration timer for the on-duration monitoring based on a wake-up signal configuration from the communication network, wherein the information comprises on-duration monitoring configuration based on at least one data radio bearer affected by the failure comprises a delay-stringent requirement, wherein the delay-stringent requirement comprises at least one of a communication network technology requirement or a quality of service requirement, wherein the information comprises a configuration to determine, based on a required maximum latency level of the delay-stringent requirement of the at least one data radio bearer affected by the failure, a length of the at least one of a discontinuous reception cycle, and wherein the determined length of the at least one of a discontinuous reception cycle is used to establish a dependency between the indication from the communication network and a quality of service requirement of the at least one network device.

In an example aspect of the invention, there is an apparatus such as network side apparatus or a gNB 12 or NN 13 as in FIG. 3, comprising: at least one processor; and at least one memory including computer program code, where the at least one memory and the computer program code are configured, with the at least one processor, to cause the apparatus to at least: determine in a communication network, information comprising a configuration for performing on-duration monitoring if a failure of network node channel access is detected during or preceding a wake-up signal occasion; and send an indication of the information towards the at least one network device.

A further example embodiment is an apparatus comprising the apparatus of the previous paragraphs, wherein the configuration is for use while the at least one network device is in a sleep mode, and wherein the configuration is for the on-duration monitoring to be performed without a preceding wake-up signal indicating wake-up during a wake-up signal occasion associated with the sleep mode, wherein the configuration is for use for detecting the failure of network node channel access based on a lack of detection of one or more signals or channels to be transmitted during a discovery reference signal window, wherein the configuration is for use for detecting the failure of network node channel access during a discovery reference signal window that is one of during or preceding the wake-up signal occasion, wherein the configuration is based on at least one of a discontinuous reception cycle or a wake-up signal frequency associated with the at least one network device, and wherein the indication accounts for a number of consecutive ones of the failure of the network node channel access, wherein the configuration is for use in determining to start a discontinuous reception On-duration timer for the on-duration monitoring after N+1 subsequent listen before talk failures observed during at least one discovery reference signal window that occur closest to the wake-up signal occasion, wherein the information comprises a configuration to start a discontinuous reception On-duration timer for the on-duration monitoring based on a wake-up signal configuration from the communication network, wherein the information comprises on-duration monitoring configuration based on at least one data radio bearer affected by the failure comprises a delay-stringent requirement, wherein the delay-stringent requirement comprises at least one of a communication network technology requirement or a quality of service requirement, wherein the information comprises a configuration to determine, based on a required maximum latency level of the delay-stringent requirement of the at least one data radio bearer affected by the failure, a length of the at least one of a discontinuous reception cycle, wherein the determined length of the at least one of a discontinuous reception cycle is used to establish a dependency between the indication from the communication network and a quality of service requirement of the at least one network device.

In an example aspect of the invention, there is an apparatus such as network apparatus or a gNB 12 or NN 13 as in FIG. 3, comprising: means for determining in a communication network, information comprising a configuration for performing on-duration monitoring if a failure of network node channel access is detected during or preceding a wake-up signal occasion; and means for sending an indication of the information towards the at least one network device.

In accordance with the example embodiments as described in the paragraph above, at least the means for determining and sending comprises a network interface, and computer program code stored on a computer-readable medium and executed by at least one processor.

A further example embodiment is an apparatus comprising the apparatus of the previous paragraphs, wherein the configuration is for use while the at least one network device is in a sleep mode, and wherein the configuration is for the on-duration monitoring to be performed without a preceding wake-up signal indicating wake-up during a wake-up signal occasion associated with the sleep mode, wherein the configuration is for use for detecting the failure of network node channel access based on a lack of detection of one or more signals or channels to be transmitted during a discovery reference signal window, wherein the configuration is for use for detecting the failure of network node channel access during a discovery reference signal window that is one of during or preceding the wake-up signal occasion, wherein the configuration is based on at least one of a discontinuous reception cycle or a wake-up signal frequency associated with the at least one network device, and wherein the indication accounts for a number of consecutive ones of the failure of the network node channel access, wherein the configuration is for use in determining to start a discontinuous reception On-duration timer for the on-duration monitoring after N+1 subsequent listen before talk failures observed during at least one discovery reference signal window that occur closest to the wake-up signal occasion, wherein the information comprises a configuration to start a discontinuous reception On-duration timer for the on-duration monitoring based on a wake-up signal configuration from the communication network, wherein the information comprises on-duration monitoring configuration based on at least one data radio bearer affected by the failure comprises a delay-stringent requirement, wherein the delay-stringent requirement comprises at least one of a communication network technology requirement or a quality of service requirement, wherein the information comprises a configuration to determine, based on a required maximum latency level of the delay-stringent requirement of the at least one data radio bearer affected by the failure, a length of the at least one of a discontinuous reception cycle, wherein the determined length of the at least one of a discontinuous reception cycle is used to establish a dependency between the indication from the communication network and a quality of service requirement of the at least one network device.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1 shows channel access schemes for initiating a COT by a gNB as LBE device;

FIG. 2 shows a DRS window in NR-U;

DETAILED DESCRIPTION

Figure 3:
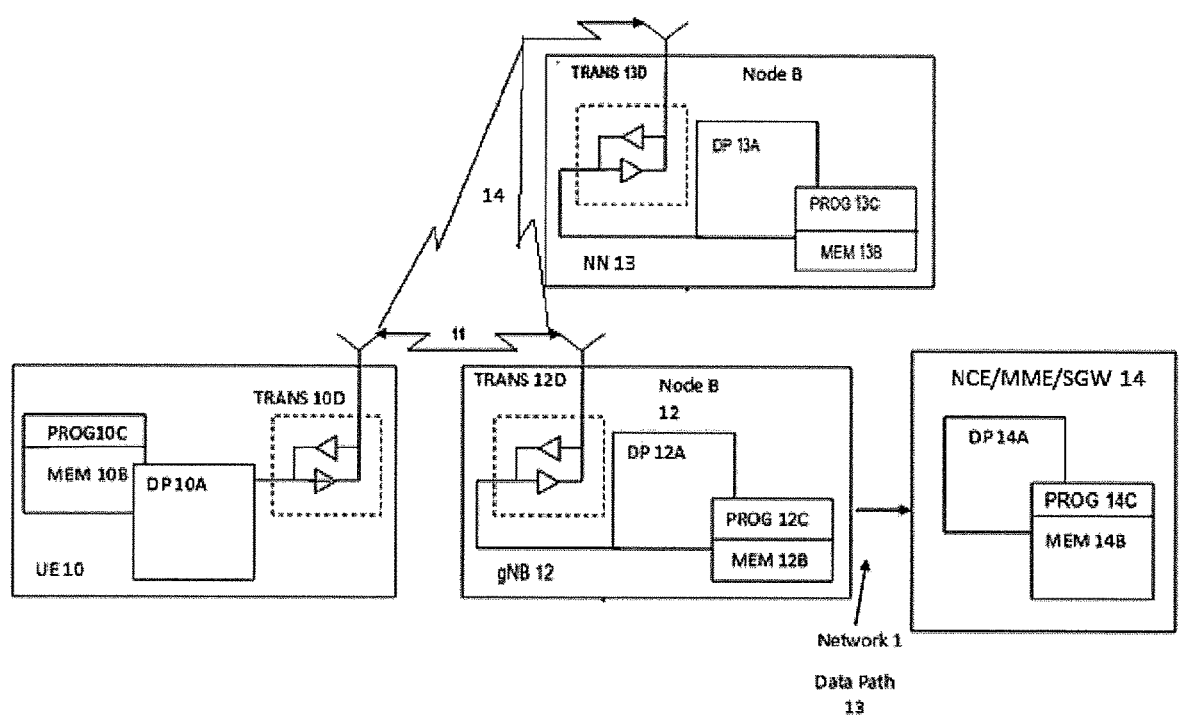
FIG. 3 shows a high level block diagram of various devices used in carrying out various aspects of the invention.

In example embodiments of this invention, there is proposed at least method and apparatus to at least perform on-duration monitoring based on detection of a failure of network node channel access during or preceding a wake-up signal occasion.

The modelling of PDCCH-WUS (Wake Up Signalling) on UE power saving in NR and its connection to DRX is under discussion at the 3GPP standards body at the time of this application. DRX has been introduced already to LTE and was inherited by NR as well.

A WUS is designed to allow the UE to skip PDCCH monitoring during DRX OnDurations when there is no data transmission to be done. This monitoring can be performed during a PDCCH occasion time duration (e.g., one or a consecutive number of symbols) during which a MAC entity associated with the UE is configured to monitor the PDCCH.

If the NW intends to schedule the UE, it needs to send a wake up indication to the UE during the WUS occasion(s) to wake up the UE first, the UE will then monitor normal PDCCH for scheduling data at the upcoming DRX OnDuration. DRX OnDuration may refer to starting a timer (e.g., drx-onDurationTimer) during which the UE is in DRX Active Time and monitors PDCCH. WUS may refer to signaling by the NW to the UE based on which the UE starts the timer for the next DRX OnDuration. Such signaling by the NW may be conducted by means of L1 signaling (e.g., by Downlink Control Information—DCI), by means of MAC signaling (e.g., by MAC Control Element), or by means of RRC signaling. Additionally, the WUS may be L1 signaling DCI with CRC scrambled by PS-RNTI based on which the UE decodes the DCI with such WUS control information. The control information may be in form of a bit indicting wake-up or not. The WUS may also be called as WUI (Wake Up Indication), PSI (Power Saving Indication), or DCP (DCI with CRC scrambled by PS-RNTI). Furthermore, the PS-RNTI may be defined as UE identification for indicating a UE to monitor PDCCH on the next occurrence of the connected mode DRX on-duration. The WUS may referred to as "DCI with CRC scrambled by PS-RNTI", where PS-RNTI is the RNTI used to identify the power saving signal for the configured UE.

It is noted that a DRX cycle can specify a periodic repetition of the DRX On Duration followed by a possible period of inactivity. An onDurationTimer can specify a number of consecutive PDCCH-subframe(s) at the beginning of a DRX Cycle. There can be represented a union over the PDCCH-subframe(s) for serving cells.

It is noted that at the time of this application relevant operations based on the standards can include:
Monitoring by a UE the WUS outside the DRX-Active Time;
Upon receiving an indication to wake up in the WUS, the UE performs PDCCH monitoring during the next DRX-OnDuration; and
If the UE does not receive the WUS or the indication in the detected WUS indicates that the UE shall not wake up, the UE does not perform PDCCH monitoring during the next DRX-OnDuration, unless the preceding WUS occasion fell within a DRX-Active Time.
NR Channel Access (Listen-Before-Talk (LBT)) Options The physical layer may perform a listen-before-talk procedure, according to which transmissions are not performed if a channel is identified as being occupied.

If absence of Wi-Fi cannot be guaranteed (e.g. by regulation) in the band (sub-7 GHz) where NR-U is operating, the baseline assumption is, the NR-U operating bandwidth is an integer multiple of 20 MHz. For channel access mechanism, LTE-LAA LBT mechanism is adopted as baseline for 5 GHz band and adopted as the starting point of the design for 6 GHz band. At least for band where absence of Wi-Fi cannot be guaranteed (e.g. by regulation), LBT can be performed in units of 20 MHz.

For 5 GHz band, having a 16 us gap to accommodate for the transceiver turnaround before the immediate transmission of the responding node is beneficial for NR-U, such as for supporting fast A/N feedback, and is permitted per regulation. Restrictions/conditions on when this option can be used will be further identified, e.g., in consideration of fair coexistence.

FIG. 1 shows a Table of Channel access schemes for initiating a COT by gNB as LBE device. As shown in FIG. 1 there is CAT2 LBT and CAT4 LBT scenario operations for scenarios 110, 120, and 130. Scenario 110 of FIG. 1 is for DRS alone or multiplexed with non-unicast data e.g., other system information (OSI), Paging, and/or random access response (RAR). Whereas scenario 120 of FIG. 1 is for DRS multiplexed with unicast data, and Scenario 130 of FIG. 1 is for PDCCH and PDSCH. For Scenario 120 and 130 CAT2 LBT is not allowed.

Note that with regards to FIG. 1 in standards at the time of this application there is applicability of an LBT scheme other than Cat4 LBT for control messages related to initial/random access, mobility, paging, reference signals only, and PDCCH-only transmissions, e.g. "RACH message 4", handover command, GC-PDCCH, or short message paging transmitted either alone or when multiplexed with DRS have been discussed.

Channel Access Schemes

The channel access schemes for NR-based access for unlicensed spectrum can be classified into the following categories:

Category 1: Immediate transmission after a short switching gap:
This is used for a transmitter to immediately transmit after a switching gap inside a COT, and
The switching gap from reception to transmission is to accommodate the transceiver turnaround time and is no longer than 16 μs;

Category 2: LBT without random back-off:
The duration of time that the channel is sensed to be idle before the transmitting entity transmits is deterministic;

Category 3: LBT with random back-off with a contention window of fixed size:
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel;

Category 4: LBT with random back-off with a contention window of variable size:
The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used. DRS window occur with SSB burst periodicity.

FIG. 2 shows a DRS window in NR-U. As shown in column 210 of FIG. 2 there is scenarios including a DRS-WindowLength-r16, and Discovery Burst-WindowLength-r16. Column 220 of FIG. 2 shows resulting additions in ServingCellConfigCommon and ServingCellConfigCommonSIB based on the scenario and also items for further study (FFS) at the time of this application. Column 230 of FIG. 2 shows for the scenario a further study (FFS) item at the time of this application with regards to resulting length configurations based on the scenario. Then column 240 of FIG. 2 shows Agreements including that a DRS transmission window duration can be configured as 0.5 1, 2, 3, 4, or 5 ms, if the DRS transmission window duration is not known, a UE may assume the DRS transmission window has a duration of 5 ms.

PDCCH-WUS Monitoring Window in NR

WUS monitoring window is an event which starts 0 ms before onDuration period and ends several slots/symbols before onDuration (due to processing time constrains). During that period, UE monitors set of search-space set occasions (one search-space set per CORESET) configured for WUS PS-RNTI.

In addition to this window an onDurationTimer can specify a number of consecutive PDCCH-subframe(s) at the beginning of a DRX Cycle. While a PDCCH period (pp) can refer to an interval between the start of two consecutive PDCCH occasions and depends on a used PDCCH search space.

It is noted that problems with current standards at the time of this application include that for a network there is basic UE behaviour related to WUS. This basic behavior includes that in a PDCCH-WUS occasion that a UE is monitoring, if the UE is indicated to wake-up to monitor the PDCCH during the next occurrence of the drx-onDurationTimer. After this, the UE starts the drx-onDurationTimer at its next occasion. Otherwise, if no WUS is received, the UE does not start the timer and does not start the active time.

However, it is noted that enforcing the latter as above strictly results in the UE is not to wake up when it is not able to either monitor for or receive WUS during the WUS window, which can be an undesired outcome.

Scenarios (a) for LBT Failure and (b) for Lack of Data

In example embodiments of this invention there is at least addressed NR-U scenarios when the UE does not know whether the network has not transmitted a WUS because of case (a) LBT failure or case (b) the lack of data.

In case of (a) LBT failure, during the WUS window Listen Before Talk (LBT) may fail (channel busy), thus the network will not be able to send a potential WUS signal even if data is pending at the network buffer for the UE.

In this regard a network node such as a RAN2 has not specified anything for WUS in connection with NR-U yet because NR-U is not in scope of the WID on UE Power Saving, within which 3GPP defined WUS. I.e. although WUS can be configured also for NR-U-capable UEs, no enhancements tailored to NR-U are in current standards at the time of this application. The problem of a larger UE power consumption in NR-U compared to NR will however be apparent when NR-U deployments materialize and the UE power saving topic in NR-U will have to be addressed as part of NR maintenance or at later standards body releases or work items.

In case of (b) the lack of data, for good coexistence, a gNB should not transmit periodic signals, unless they are extremely essential (such as SSB and system information) transmitted with CAT2 in DRS limited to ½0% of time/duty-cycle, i.e. 1 ms once 40 ms. For example a gNB may configure SSB burst as often as 5 ms and however needs to perform CAT4 LBT which is not desirable. Therefore, due to coexistence and to save power, a NR-U gNB would not transmit WUS unless the gNB wants to wake up a UE.

If an LBT failure happens during a DRS window (i.e., the gNB did not get channel access during a DRS window using CAT2), there is a high likelihood that the access could have failed also during the WUS window (using CAT4) that follows the DRS window.

In case of LBT failure in downlink, it would be beneficial if the consequent UE behaviour would depend on network decision. Specifically, in case of "delay tolerant" data, the network may wait for the next WUS opportunity to indicate the presence of data to achieve a larger UE power saving, whereas in case of "delay stringent" data the network may prefer to send the data during the next OnDuration despite the WUS was not transmitted because of LBT failure in order to avoid increasing latency (despite the UE would waste unnecessarily power in case of no data).

Therefore example embodiments of the invention address at least:
how UE recognize case (a) LBT failure from case and/or (b) lack of data; and
and if UE recognizes (a) LBT failure from (b) lack of data, how a UE should behave Before describing the example embodiments of the invention in detail, reference is made to FIG. 3 for illustrating a simplified block diagram of various electronic devices that are suitable for use in practicing the example embodiments of this invention.

FIG. 3 shows a block diagram of one possible and non-limiting exemplary system in which the example embodiments of the invention may be practiced. In FIG. 3, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 3. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE/MME/SGW 14 of FIG. 3.

The NN 13 can comprise a mobility function device such as an AMF or SMF, further the NN 13 may comprise a NRJ5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW 14 of FIG. 3. The NCE/MME/SGW 14 including MME (Mobility Management Entity)/SGW (Serving Gateway) functionality, such as User Plane Functionalities, and/or an Access Management functionality for LTE and similar functionality for 5G.

The one or more buses of the device of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 3 shows a network node or base station such as the gNB 12 as in FIG. 3 and mobility management device such as the NN 13 as in FIG. 3, these devices can incorporate or be incorporated into an eNodeB or eNB or gNB such as for LTE and NR, and would still be configurable to perform example embodiments of the invention as described in this application.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, gNB 12, NN 13, NCE/MME/SGW 14 and other functions as described herein.

Example embodiments of this invention provide at least a method and an apparatus with means to control/adapt the start of an OnDurationtimer if UE detects an LBT failure in downlink during WUS occasions preceding the OnDuration (thus leading to the UE not monitoring for receiving the WUS and/or not monitoring or detecting one or more signals or channels to be transmitted during a discovery reference signal window, such as based on PSS/SSS or PBCH associated with an SSB to be transmitted in DRS by gNB. In accordance with an example embodiment of the invention a lack of detection in a DRS window can cause the UE or another network device to determine an LBT failure. For example in accordance with example embodiments of the invention an LBT failure of network node channel access can be detected based on a lack of detection of one or more signals or channels to be transmitted during a discovery reference signal window.

In accordance with example embodiments of the invention control and adaptation for these operations can be based on the 5QI, 5G QoS Indicator. The 5QI, 5G QoS Indicator such as for service latency, such as on the DRX cycle/WUS frequency, and (potentially) accounting also for the number of consecutive LBT failures, according to a network configuration.

In accordance with example embodiments of the invention a determined relationship between DRX cycle/WUS frequency and QoS/5QI (service latency) can also include that it can be determined based on tightness or level of a latency target requirement a length of the DRX cycle. For example the higher the tightness or level of a latency target requirement then the shorter the DRS cycle. This determining in accordance with example embodiments of the invention can help a network device establish indirectly a dependency between the network indication and a network device QoS profile, for use in operations as disclosed herein.

Operations in accordance with example embodiments of the invention will result for instance in the UE performing DRX-OnDuration monitoring without a preceding WUS indication if one or more LBT failures have been detected during the DRS window preceding the DRX-ONDuration and/or if one or more of the configured DRBs have delay-stringent requirement (e.g. based on QoS/5QI).

Example embodiments of the invention as disclosed herein include that the DRX-OnDurationtimer is not to be started if the UE detects an LBT failure during one or more DRS window(s) preceding the ONDuration. In accordance with example embodiments of the invention the DRS window(s) can be during or preceding a WUS window.

In accordance with example embodiments of the invention at least the detecting the LBT failure during these windows can be further depending on the QoS/5QI, and/or depending on the DRS, DRX cycle and/or WUS frequency.

In accordance with example embodiments of the invention, there can be determining whether to start an ONDurationtimer, after detecting one or more subsequent LBT failure(s) in DL overlapping at least partially with WUS occasions/window related to control the subsequent ONDuration, is configured by the network e.g. as part of the WUS configuration.

In accordance with example embodiments of the invention, the NR-U UE can monitor for Listen-Before-Talk (LBT) failure in DL for the purpose of power saving based at least on a DRS window.

In accordance with example embodiments of the invention, the NR-U UE can monitor for subsequent Listen-Before-Talk (LBT) failure(s) in DL for the purpose of power saving.

In accordance with example embodiments of the invention, the NR-U UE can monitor for Listen-Before-Talk (LBT) failure(s) in DL for the purpose of power saving only if it is configured to skip starting the DRX-OnDurationtimer.

Further, in accordance with example embodiments of the invention, the NR-U UE can be configured to skip starting the DRX-OnDurationtimer when detecting LBT failures, it will start the DRX-OnDurationtimer after N+1 subsequent LBT failures observed during DRS windows that occur closest to the WUS occasions/window. This is to maximize the correlation between probability that DRS had LBT failure (as can be measured by UE) and WUS window had LBT failure, as in accordance with example embodiments of the invention.

It should be noted that the above actions may in this way be able to "overwrite" the default UE behaviour, which may be configured through the ps-WakeupOrNot, such that if a UE is configured to continue sleeping in case of not detecting the WUS correctly, the UE may through these triggers still be required to monitor for the PDCCH in the next OnDuration.

It is noted that as described herein example embodiments of the invention can be applicable to improve operations using a WUS design where the PDCCH-WUS and/or DCI with CRC is scrambled by PS-RNTI. However, it is further noted that example embodiments of the invention can be applied to advantage any WUS design standards acceptances at the time of this application and/or future standards acceptances. The example embodiments of the invention can be applicable to improve operations of WUS designs at least such as WUS designs of NB-IoT and/or WUS designs where a WUS is transmitted with a different DCI format than for example but not limited to a format 2_6, or on a different channel than PDCCH, and/or using physical signals/sequences such as DMRS.

Advantages of operations in accordance with example embodiments of the invention as disclosed herein include at least that UE behavior in case the WUS overlaps with certain activities including LBT failure in NR-U is defined and gives more flexibility to the network to determine the best tradeoff between UE power saving and latency targets.

Figure 4A:
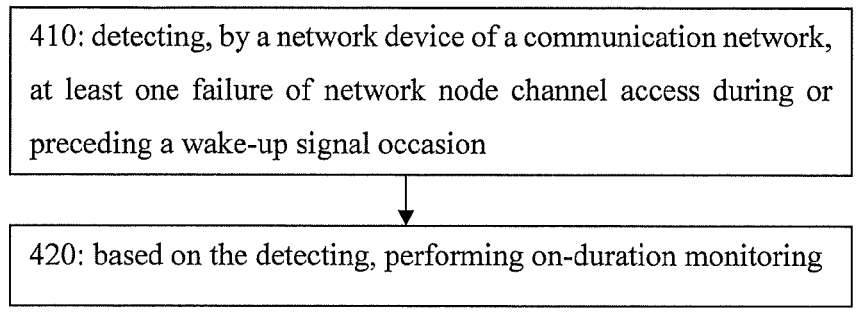
FIG. 4A and FIG. 4B each show a method which may be performed by an apparatus in accordance with example embodiments of the invention.

FIG. 4A illustrates operations in accordance with example embodiments of the invention which may be performed by a network device such as, but not limited to, a network device such as a UE 10 as in FIG. 3. As shown in step 410 of FIG. 4A there is detecting, by a network device of a communication network, at least one failure of network node channel access during or preceding a wake-up signal occasion. Then as shown in step 420 of FIG. 4A there is based on the detecting, performing on-duration monitoring.

In accordance with the example embodiments as described in the paragraph above, wherein the network device is in a sleep mode, and wherein the on-duration monitoring is performed without receiving a preceding wake-up signal indicating wake-up during a wake-up signal occasion associated with the sleep mode.

In accordance with the example embodiments as described in the paragraphs above, wherein the failure of network node channel access is detected based on a lack of detection of one or more signals or channels to be transmitted during a discovery reference signal window for the network device.

In accordance with the example embodiments as described in the paragraphs above, wherein the failure is during a discovery reference signal window that is one of during or preceding the wake-up signal occasion.

In accordance with the example embodiments as described in the paragraphs above, wherein the failure of network node channel access comprises at least one listen before talk failure of a device of the communication network.

In accordance with the example embodiments as described in the paragraphs above, wherein at least one of detecting or performing on-duration monitoring is based on an indication from the communication network.

In accordance with the example embodiments as described in the paragraphs above, wherein the indication is based on at least one of a discontinuous reception cycle or a wake-up signal frequency associated with the network device, and wherein the indication accounts for a number of consecutive ones of the failure of the network node channel access.

In accordance with the example embodiments as described in the paragraphs above, wherein the on-duration monitoring comprises discontinuous reception on-duration monitoring.

In accordance with the example embodiments as described in the paragraphs above, wherein the performing on-duration monitoring comprises: based on an indication from the communication network, determining to start a discontinuous reception On-duration timer for the on-duration monitoring.

In accordance with the example embodiments as described in the paragraphs above, wherein starting the discontinuous reception On-duration timer is performed after N+1 subsequent listen before talk failures observed during at least one discovery reference signal window that occur closest the wake-up signal occasion.

In accordance with the example embodiments as described in the paragraphs above, wherein at least one of the N+1 subsequent listen before talk failures observed during the at least one discovery reference signal window is occurring not later than the wake-up signal occasion.

In accordance with the example embodiments as described in the paragraphs above, wherein determining to start a discontinuous reception for the On-duration monitoring is based on a wake-up signal configuration from the communication network.

In accordance with the example embodiments as described in the paragraphs above, wherein the on-duration monitoring is performed based on determining that the at least one data radio bearer affected by the failure comprises a delay-stringent requirement.

In accordance with the example embodiments as described in the paragraphs above, wherein the delay-stringent requirement comprises at least one of a communication network technology requirement or a quality of service requirement.

In accordance with the example embodiments as described in the paragraphs above, there is determining, based on a required maximum latency level of the delay-stringent requirement of the at least one data radio bearer affected by the failure, a length of the at least one of a discontinuous reception cycle.

In accordance with the example embodiments as described in the paragraphs above, wherein the determined length of the at least one of a discontinuous reception cycle is used to establish a dependency between the indication from the communication network and a quality of service requirement of the network device.

A non-transitory computer-readable medium (MEM 10B as in FIG. 3) storing program code (PROG 10C as in FIG. 3), the program code executed by at least one processor (DP 10A as in FIG. 3) to perform the operations as at least described in the paragraphs above.

In accordance with an example embodiment of the invention as described above there is an apparatus comprising: means for detecting (TRANS 10D, MEM 10B, PROG 10C, and DP 10A as in FIG. 3), by a network device (UE 10 as in FIG. 2) of a communication network (Network 1 as in FIG. 3), at least one failure of network node channel access during or preceding a wake-up signal occasion; and means based on the detecting, for performing (TRANS 10D, MEM 10B, PROG 10C, and DP 10A as in FIG. 3) on-duration monitoring.

In the example aspect of the invention according to the paragraph above, wherein at least the means for detecting and performing comprises a non-transitory computer readable medium [MEM 10B] encoded with a computer program [PROG 10C] executable by at least one processor [DP 10A].

Figure 4B:
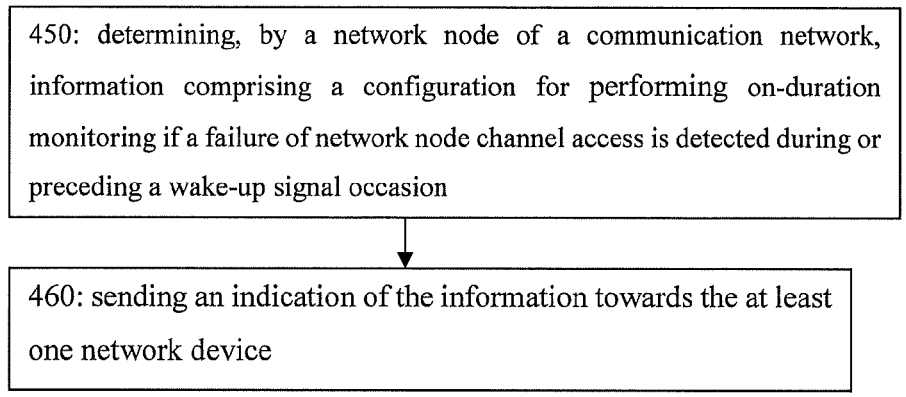

FIG. 4B illustrates operations in accordance with example embodiments of the invention which may be performed by a network device such as, but not limited to, a network device such as a gNB 12 or NN 13 as in FIG. 3. As shown in step 450 of FIG. 4B there is determining, by a network node of a communication network, information comprising a configuration for performing on-duration monitoring if a failure of network node channel access is detected during or preceding a wake-up signal occasion. Then as shown in step 460 of FIG. 4B there is sending an indication of the information towards the at least one network device.

In accordance with the example embodiments as described in the paragraphs above, wherein the configuration is for use while the at least one network device is in a sleep mode, and wherein the configuration is for the on-duration monitoring to be performed without a preceding wake-up signal indicating wake-up during a wake-up signal occasion associated with the sleep mode.

In accordance with the example embodiments as described in the paragraphs above wherein the configuration is for use for detecting the failure of network node channel access based on a lack of detection of one or more signals or channels to be transmitted during a discovery reference signal window.

In accordance with the example embodiments as described in the paragraphs above wherein, the configuration is for use for detecting the failure of network node channel access during a discovery reference signal window that is one of during or preceding the wake-up signal occasion.

In accordance with the example embodiments as described in the paragraphs above wherein the configuration is based on at least one of a discontinuous reception cycle or a wake-up signal frequency associated with the at least one network device, and wherein the indication accounts for a number of consecutive ones of the failure of the network node channel access.

In accordance with the example embodiments as described in the paragraphs above wherein the configuration is for use in determining to start a discontinuous reception On-duration timer for the on-duration monitoring after N+1 subsequent listen before talk failures observed during at least one discovery reference signal window that occur closest to the wake-up signal occasion.

In accordance with the example embodiments as described in the paragraphs above wherein the information comprises a configuration to start a discontinuous reception On-duration timer for the on-duration monitoring based on a wake-up signal configuration from the communication network.

In accordance with the example embodiments as described in the paragraphs above wherein the information comprises on-duration monitoring configuration based on at least one data radio bearer affected by the failure comprises a delay-stringent requirement.

In accordance with the example embodiments as described in the paragraphs above wherein the delay-stringent requirement comprises at least one of a communication network technology requirement or a quality of service requirement.

In accordance with the example embodiments as described in the paragraphs above wherein the information comprises a configuration to determine, based on a required maximum latency level of the delay-stringent requirement of the at least one data radio bearer affected by the failure, a length of the at least one of a discontinuous reception cycle.

In accordance with the example embodiments as described in the paragraphs above wherein the determined length of the at least one of a discontinuous reception cycle is used to establish a dependency between the indication from the communication network and a quality of service requirement of the at least one network device.

A non-transitory computer-readable medium (MEM 12B and/or MEM 13B as in FIG. 3) storing program code (PROG 12C and/or PROG 13C as in FIG. 3), the program code executed by at least one processor (DP 12A and/or DP 13A as in FIG. 3) to perform the operations as at least described in the paragraphs above.

In accordance with an example embodiment of the invention as described above there is an apparatus comprising: means for determining (TRANS 12D and/or TRANS 13D, MEM 12B and/or MEM 13B, PROG 12C and/or PROG 13C, and DP 12A and/or DP 13A as in FIG. 3), by a network node (gNB 12 and/or NN 13 as in FIG. 3) of a communication Network 1 as in FIG. 3), information comprising a configuration (MEM 12B and/or MEM 13B, PROG 12C and/or PROG 13C, and DP 12A and/or DP 13A as in FIG. 3) for use by at least one network device (UE 10 as in FIG. 3) of the communication network to perform on-duration monitoring if a failure of network node channel access is detected during or preceding a wake-up signal occasion; and means for sending (TRANS 12D and/or TRANS 13D, MEM 12B and/or MEM 13B, PROG 12C and/or PROG 13C, and DP 12A and/or DP 13A as in FIG. 3) an indication of the information towards the at least one network device.

In the example aspect of the invention according to the paragraph above, wherein at least the means for determining and sending comprises a non-transitory computer readable medium [MEM 12B and/or MEM 13B as in FIG. 3] encoded with a computer program [PROG 12C and/or PROG 13C as in FIG. 3] executable by at least one processor [DP 12A and/or DP 13A and in FIG. 3].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one memory storing instructions that, when executed by the at least one processor, cause the apparatus at least to:
   detect, at a network device of a communication network, at least one failure of network node channel access during or preceding a wake-up signal occasion,
   wherein the at least one failure of the network node channel access comprises at least one listen before talk failure, and
   wherein based on the at least one listen before talk failure a wake-up signal cannot be communicated when data is pending; and
   based on the detecting, perform on-duration monitoring.

2. The apparatus of claim 1, wherein the network device is in a sleep mode, and wherein the on-duration monitoring is performed without receiving a preceding wake-up signal indicating wake-up during a wake-up signal occasion associated with the sleep mode.

3. The apparatus of claim 1, wherein the failure of network node channel access is detected based on a lack of detection of one or more signals or channels to be transmitted during a discovery reference signal window.

4. The apparatus of claim 1, wherein the failure is during a discovery reference signal window that is one of during or preceding the wake-up signal occasion.

5. The apparatus of claim 1, wherein at least one of detecting or performing on-duration monitoring is based on an indication from the communication network.

6. The apparatus of claim 5, wherein the indication is based on at least one of a discontinuous reception cycle or a wake-up signal frequency associated with the network device, and wherein the indication accounts for a number of consecutive ones of the failure of the network node channel access.

7. The apparatus of claim 1, wherein the on-duration monitoring comprises
   discontinuous reception on-duration monitoring.

8. The apparatus of claim 1, wherein the performing on-duration monitoring comprises:
   based on an indication from the communication network, determining to start a discontinuous reception On-duration timer for the on-duration monitoring.

9. The apparatus of claim 1, wherein the on-duration monitoring is performed based on determining that at least one data radio bearer affected by the failure comprises a delay-stringent requirement.

10. An apparatus, comprising:
    at least one processor; and
    at least one memory storing instructions that, when executed by the at least one processor, cause the apparatus at least to:
    determine, at a network node of a communication network, information comprising a configuration for performing on-duration monitoring if a failure of network node channel access is detected during or preceding a wake-up signal occasion,
    wherein the failure of the network node channel access comprises at least one listen before talk failure, and
    wherein based on the at least one listen before talk failure a wake-up signal cannot be communicated when data is pending; and
    send an indication of the information towards the at least one network device.

11. The apparatus of claim 10, wherein the configuration is for use while the at least one network device is in a sleep mode, and wherein the configuration is for the on-duration monitoring to be performed without a preceding wake-up signal indicating wake-up during a wake-up signal occasion associated with the sleep mode.

12. The apparatus of claim 10, wherein the configuration is for use for detecting the failure of network node channel access based on a lack of detection of one or more signals or channels to be transmitted during a discovery reference signal window.

13. The apparatus of claim 10, wherein the configuration is for use for detecting the failure of network node channel access during a discovery reference signal window that is one of during or preceding the wake-up signal occasion.

14. The apparatus of claim 10, wherein the configuration is based on at least one of a discontinuous reception cycle or a wake-up signal frequency associated with the at least one network device, and wherein the indication accounts for a number of consecutive ones of the failure of the network node channel access.

15. The apparatus of claim 10, wherein the information comprises a configuration to start a discontinuous reception On-duration timer for the on-duration monitoring based on a wake-up signal configuration from the communication network.

16. The apparatus of claim 10, wherein the information comprises on-duration monitoring configuration based on at least one data radio bearer affected by the failure comprises a delay-stringent requirement.

17. A method, comprising:
   detecting, by a network device of a communication network, at least one failure of network node channel access during or preceding a wake-up signal occasion,
   wherein the failure of the network node channel access comprises at least one listen before talk failure, and
   wherein based on the at least one listen before talk failure a wake-up signal cannot be communicated when data is pending; and
   based on the detecting, performing on-duration monitoring.

18. The method of claim 17, wherein the network device is in a sleep mode, and wherein the on-duration monitoring is performed without receiving a preceding wake-up signal indicating wake-up during a wake-up signal occasion associated with the sleep mode.

19. The method of claim 17, wherein the on-duration monitoring comprises discontinuous reception on-duration monitoring.

* * * * *